United States Patent
Masias et al.

(10) Patent No.: US 10,868,344 B2
(45) Date of Patent: Dec. 15, 2020

(54) ENTROPY DRIVEN THERMAL AND ELECTRICAL MANAGEMENT

(71) Applicant: Ford Global Technologies, LLC, Dearborn, MI (US)

(72) Inventors: Alvaro Masias, Ann Arbor, MI (US); James Matthew Marcicki, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 248 days.

(21) Appl. No.: 16/079,688

(22) PCT Filed: Feb. 25, 2016

(86) PCT No.: PCT/US2016/019443
§ 371 (c)(1),
(2) Date: Aug. 24, 2018

(87) PCT Pub. No.: WO2017/146703
PCT Pub. Date: Aug. 31, 2017

(65) Prior Publication Data
US 2019/0074558 A1   Mar. 7, 2019

(51) Int. Cl.
*H01M 10/42* (2006.01)
*H01M 10/44* (2006.01)
(Continued)

(52) U.S. Cl.
CPC ......... *H01M 10/613* (2015.04); *B60L 3/0046* (2013.01); *B60L 58/22* (2019.02);
(Continued)

(58) Field of Classification Search
CPC ............. H01M 10/613; H01M 10/443; H01M 10/486; H01M 10/4264; H01M 10/625;
(Continued)

(56) References Cited

U.S. PATENT DOCUMENTS 4,220,906 A * 9/1980 Drummond ............. H01L 37/02
310/300
6,834,066 B2 * 12/2004 Bragin ................... H01S 3/225
372/38.02
(Continued)

FOREIGN PATENT DOCUMENTS

CN   104795610 A     7/2015
JP   A-09-019074  *  1/1997
(Continued)

OTHER PUBLICATIONS

Julia Schiffer, et. al., "Heat generation in double layer capacitors," ScienceDirect, Journal of Power Sources 160 (2006) 756-772, Electrochemical Energy Conversion and Storage Systems Group, Institute for Power Electronics and Electrical Drivers (ISEA) RWTH Aachen University, Jaegerstrasse 17-19, D-5066 Aachen, Germany, dated Feb. 7, 2006, 8 pages.
(Continued)

*Primary Examiner* — John T Trischler
(74) *Attorney, Agent, or Firm* — David B. Kelley; Brooks Kushman PC

(57) ABSTRACT

A capacitor is configured to be in thermal contact with an electrical load. A controller is configured to charge and discharge the capacitor to change a temperature of the capacitor. The controller is configured to selectively discharge the capacitor at a discharge current at which entropic cooling of the capacitor is greater than Joule heating of the capacitor to provide cooling for the electrical load.

18 Claims, 5 Drawing Sheets

(51) Int. Cl.
  *H01M 10/48* (2006.01)
  *H01M 10/65* (2014.01)
  *H01M 10/613* (2014.01)
  *B60L 58/22* (2019.01)
  *H01M 10/625* (2014.01)
  *H01M 10/657* (2014.01)
  *H01M 16/00* (2006.01)
  *B60L 3/00* (2019.01)

(52) U.S. Cl.
  CPC ..... *H01M 10/4264* (2013.01); *H01M 10/443* (2013.01); *H01M 10/486* (2013.01); *H01M 10/625* (2015.04); *H01M 10/657* (2015.04); *H01M 16/00* (2013.01); *H01M 2010/4271* (2013.01); *H01M 2220/20* (2013.01)

(58) Field of Classification Search
  CPC ... H01M 10/657; H01M 16/00; B60L 3/0046; B60L 58/22
  USPC .................................................. 320/150, 166
  See application file for complete search history.

(56) References Cited

U.S. PATENT DOCUMENTS

| | | | |
|---|---|---|---|
| 6,904,342 B2* | 6/2005 | Hanada | F02N 11/0866 701/22 |
| 7,339,353 B1* | 3/2008 | Masias | H02J 2207/40 320/138 |
| 7,528,572 B2* | 5/2009 | Masias | H02J 2207/40 320/110 |
| 7,605,492 B2* | 10/2009 | Elder | B60L 58/10 307/9.1 |
| 7,795,844 B2* | 9/2010 | Ichikawa | H01M 10/613 320/134 |
| 8,134,338 B2* | 3/2012 | Choi | H02J 7/0016 320/134 |
| 8,336,319 B2* | 12/2012 | Johnston | B60L 58/26 62/79 |
| 8,402,776 B2* | 3/2013 | Johnston | B60L 50/40 62/79 |
| 8,448,696 B2* | 5/2013 | Johnston | B60L 3/0046 165/104.32 |
| 8,658,299 B2 | 2/2014 | Yang et al. | |
| 8,901,861 B2* | 12/2014 | Luke | B60L 53/665 318/376 |
| 9,018,892 B2* | 4/2015 | Agarwal | H02J 7/0016 320/101 |
| 9,048,669 B2* | 6/2015 | Lim | H02J 7/0019 |
| 9,196,930 B2* | 11/2015 | Chorian | H01M 2/348 |
| 9,331,507 B2* | 5/2016 | Srinivasan | H01M 2/34 |
| 9,509,024 B2* | 11/2016 | Masias | H01M 10/4235 |
| 9,515,357 B2* | 12/2016 | Haskins | H01M 10/486 |
| 9,553,344 B2* | 1/2017 | Masias | F04B 43/12 |
| 9,590,282 B2* | 3/2017 | Kossakovski | H01M 10/6551 |
| 9,614,263 B2* | 4/2017 | Yang | H01M 10/6557 |
| 9,625,530 B2* | 4/2017 | Masias | G01R 31/385 |
| 9,768,433 B2* | 9/2017 | Masias | H01M 2/30 |
| 9,780,420 B2* | 10/2017 | Masias | H01M 10/657 |
| 9,786,969 B2* | 10/2017 | Masias | H01M 10/6567 |
| 9,799,932 B2* | 10/2017 | Haskins | H01M 10/486 |
| 9,843,069 B2* | 12/2017 | Marcicki | H01M 10/0525 |
| 9,853,337 B2* | 12/2017 | Masias | H01M 10/6566 |
| 9,864,016 B2* | 1/2018 | Inguva | H01M 10/48 |
| 9,899,846 B2* | 2/2018 | Carver | H02J 7/0024 |
| 9,901,014 B2* | 2/2018 | Robert | H05K 7/20872 |
| 9,914,368 B1* | 3/2018 | Marcicki | B60L 11/1874 |
| 10,018,679 B2* | 7/2018 | Masias | G01R 31/385 |
| 10,103,562 B2* | 10/2018 | Lee | H02J 7/008 |
| 10,108,759 B2* | 10/2018 | Kim | G06F 30/20 |
| 10,109,897 B2* | 10/2018 | Haskins | H01M 10/486 |
| 10,164,303 B2* | 12/2018 | Marcicki | H01M 10/625 |
| 10,164,450 B2* | 12/2018 | Masias | B60L 58/15 |
| 10,236,547 B2* | 3/2019 | Kossakovski | H01M 10/6572 |
| 10,270,141 B2* | 4/2019 | Piggott | H05K 3/325 |
| 10,396,414 B2* | 8/2019 | Yeow | H01M 10/6555 |
| 10,483,603 B2* | 11/2019 | Masias | H01M 10/482 |
| 10,553,896 B2* | 2/2020 | Marcicki | H01M 10/0525 |
| 10,622,686 B2* | 4/2020 | Masias | H01M 10/6566 |
| 10,686,166 B2* | 6/2020 | Snyder | H01M 2/0285 |
| 2007/0247003 A1 | 10/2007 | Elder et al. | |
| 2008/0174278 A1* | 7/2008 | Masias | H02J 2207/40 320/138 |
| 2008/0211459 A1* | 9/2008 | Choi | B60L 58/16 320/134 |
| 2009/0179616 A1 | 7/2009 | Ichikawa et al. | |
| 2010/0134068 A1* | 6/2010 | Lim | H02J 7/0016 320/116 |
| 2010/0259210 A1* | 10/2010 | Sasaki | F03D 9/255 320/101 |
| 2011/0296855 A1 | 12/2011 | Johnston et al. | |
| 2012/0086390 A1* | 4/2012 | Lim | H02J 7/0019 320/107 |
| 2012/0180997 A1* | 7/2012 | Johnston | B60L 58/18 165/104.32 |
| 2012/0183815 A1* | 7/2012 | Johnston | B60L 1/003 429/50 |
| 2012/0242144 A1 | 9/2012 | Chorian et al. | |
| 2012/0251894 A1* | 10/2012 | Richard | H01M 10/052 429/338 |
| 2012/0282497 A1* | 11/2012 | Yang | H01M 10/625 429/50 |
| 2013/0033203 A1 | 2/2013 | Luke et al. | |
| 2013/0188283 A1 | 7/2013 | Midholm et al. | |
| 2013/0264999 A1* | 10/2013 | Srinivasan | H01M 10/486 320/107 |
| 2014/0210415 A1* | 7/2014 | Ohmori | H01M 10/42 320/118 |
| 2014/0242454 A1* | 8/2014 | Richard | H01M 10/052 429/188 |
| 2015/0200427 A1* | 7/2015 | Haskins | H01M 10/6555 429/62 |
| 2015/0214586 A1 | 7/2015 | Yeow et al. | |
| 2015/0236386 A1 | 8/2015 | Yang et al. | |
| 2015/0270588 A1* | 9/2015 | Masias | H01M 10/637 429/50 |
| 2015/0270710 A1* | 9/2015 | Carver | H02J 7/0024 307/109 |
| 2015/0276883 A1* | 10/2015 | Masias | G01R 31/58 324/430 |
| 2015/0278704 A1* | 10/2015 | Kim | G06F 30/20 703/2 |
| 2015/0357692 A1* | 12/2015 | Piggott | H02J 7/0068 320/107 |
| 2016/0020620 A1* | 1/2016 | Lee | H02J 7/008 320/162 |
| 2016/0093927 A1* | 3/2016 | Marcicki | H01M 10/0525 429/50 |
| 2016/0111704 A1* | 4/2016 | Masias | H01M 2/30 429/61 |
| 2016/0124052 A1* | 5/2016 | Inguva | H01M 10/48 324/431 |
| 2016/0131701 A1* | 5/2016 | Marcicki | G01R 31/382 702/63 |
| 2016/0133998 A1* | 5/2016 | Masias | H01M 10/6567 429/10 |
| 2016/0172723 A1* | 6/2016 | Masias | H01M 10/523 429/57 |
| 2016/0240903 A1* | 8/2016 | Kossakovski | H01M 10/6572 |
| 2016/0308262 A1* | 10/2016 | Masias | H01M 10/486 |
| 2017/0054311 A1* | 2/2017 | Masias | H02J 7/0029 |
| 2017/0110770 A1* | 4/2017 | Marcicki | B60K 1/04 |
| 2017/0110772 A1* | 4/2017 | Masias | B60L 58/26 |
| 2017/0125859 A1* | 5/2017 | Haskins | H01M 10/63 |
| 2017/0229683 A1* | 8/2017 | Snyder | H01M 2/0262 |
| 2017/0271728 A1* | 9/2017 | Kossakovski | H01M 10/6551 |
| 2017/0303445 A1* | 10/2017 | Robert | H01M 10/625 |
| 2017/0336477 A1* | 11/2017 | Masias | G01R 31/385 |
| 2017/0352930 A1* | 12/2017 | Masias | B60L 58/26 |
| 2017/0352932 A1* | 12/2017 | Masias | H01M 10/625 |

(56) References Cited

U.S. PATENT DOCUMENTS

| | | | |
|---|---|---|---|
| 2018/0026319 A1* | 1/2018 | Haskins | H01M 10/617 |
| | | | 429/62 |
| 2018/0053965 A1* | 2/2018 | Marcicki | H01M 10/482 |
| 2018/0108958 A1* | 4/2018 | Masias | H01M 10/625 |
| 2018/0141552 A1* | 5/2018 | Marcicki | H01M 10/617 |
| 2018/0269547 A1* | 9/2018 | Robert | H01M 2/0277 |
| 2018/0292465 A1* | 10/2018 | Osara | G01M 5/0033 |
| 2019/0217716 A1* | 7/2019 | Yang | B60L 53/60 |
| 2019/0217721 A1* | 7/2019 | Marcicki | H01M 10/66 |
| 2019/0252745 A1* | 8/2019 | Piggott | H01M 10/6572 |
| 2019/0356030 A1* | 11/2019 | Venkatasubramanian | |
| | | | H01L 35/30 |
| 2019/0372184 A1* | 12/2019 | Yeow | H01M 10/6555 |

FOREIGN PATENT DOCUMENTS

| | | |
|---|---|---|
| WO | 2014120688 A1 | 8/2014 |
| WO | 2015066079 A1 | 5/2015 |

OTHER PUBLICATIONS

International Search Report for PCT/US2016/019443, dated Apr. 29, 2016, 2 pages.

\* cited by examiner

ENTROPY DRIVEN THERMAL AND ELECTRICAL MANAGEMENT

TECHNICAL FIELD

This application generally relates to a system for thermal management of electrical components in a vehicle.

BACKGROUND

A vehicle includes various electrical loads. During operation, the electrical loads generate heat. The heat generated by the electrical loads may be excessive. Some electrical loads may be actively cooled to maintain the electrical load at a temperature less than a predefined threshold. Various components and system configurations are available for cooling electrical loads. Some include routing coolant lines to a heat exchanger coupled to the load to remove heat through the coolant.

SUMMARY

In some configurations, a thermal management system includes a capacitor in thermal contact with an electrical load. The thermal management system also includes a controller configured to selectively electrically couple the capacitor to a power source and the electrical load and programmed to, in response to a demand for cooling of the electrical load, selectively discharge the capacitor at a discharge current at which entropic cooling of the capacitor is greater than joule heating of the capacitor.

Some configurations may include one or more of the following features. The thermal management system in which the controller is programmed to selectively charge the capacitor at a charge current that is less than the discharge current. The thermal management system in which the controller is programmed to selectively charge the capacitor at a charge current at which total heating of the capacitor is less than the entropic cooling of the capacitor caused by the discharge current. The thermal management system may include a voltage converter configured to selectively electrically couple the capacitor to the power source and in which the controller is programmed to command the voltage converter to output a voltage level for charging the capacitor. The thermal management system in which the electrical load is a battery. The thermal management system in which the controller is programmed to selectively discharge the capacitor further in response to a capacitor voltage being greater than a voltage of the electrical load by a predetermined amount. The thermal management system in which the controller is programmed to selectively discharge the capacitor further in response to a demand for current to the electrical load.

In some configurations, a battery management system includes a capacitor in thermal contact with a battery. The battery management system also includes a controller configured to selectively electrically couple the capacitor to the battery to charge and discharge the capacitor and programmed to, in response to a demand for cooling of the battery, selectively discharge the capacitor at a discharge current at which entropic cooling of the capacitor is greater than joule heating of the capacitor.

Some configurations may include one or more of the following features. The battery management system in which the controller is programmed to, in response to a demand for battery cell balancing, electrically couple the capacitor to the battery to charge and discharge the capacitor to achieve a target voltage for the battery. The battery management system in which the controller is further programmed to, in response to a demand for energy storage, electrically couple the capacitor to the battery to charge the capacitor. The battery management system in which the capacitor is configured to wrap around a surface of the battery to maximize thermal contact. The battery management system in which the controller is programmed to selectively electrically couple to capacitor to the battery to charge the capacitor at a charge current that is less than the discharge current. The battery management system in which the controller is programmed to selectively charge the capacitor at a charge current at which total heating of the capacitor is less than the entropic cooling of the capacitor caused by the discharge current. The battery management system may include a voltage converter configured to selectively electrically couple the capacitor to the battery and in which the controller is programmed to command the voltage converter to output a voltage level to cause the capacitor to charge at a charge current that is less than the discharge current.

In some configurations, a method includes discharging a capacitor that is thermally and electrically coupled to a battery at a discharge current at which entropic cooling of the capacitor is greater than joule heating of the capacitor in response to a demand for battery cooling. The method also includes charging the capacitor at a charge current that is less than the discharge current.

Some configurations may include one or more of the following features. The method may include charging the capacitor at the charge current at which total heating of the capacitor is less than the entropic cooling of the capacitor caused by the discharge current. The method may include equalizing voltages of cells of the battery by charging the capacitor from the battery and discharging the capacitor into the battery in response to a demand for battery balancing. The method may include charging the capacitor from a power source external to the battery. The method may include discharging the capacitor at a discharge current that maximizes net cooling of the capacitor.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
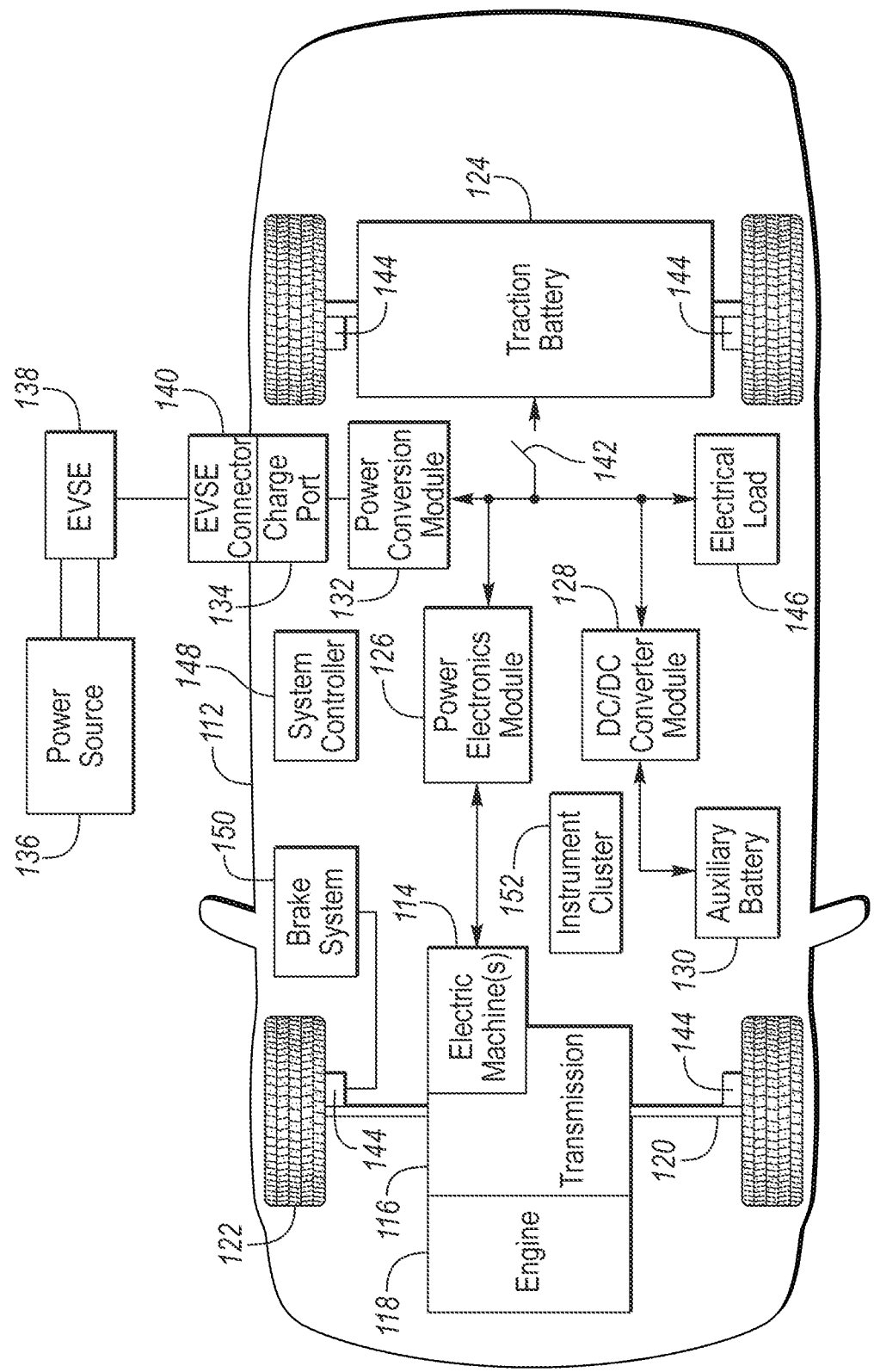
FIG. 1 is a diagram of a hybrid vehicle illustrating typical drivetrain and energy storage components.

FIG. 1 depicts a typical plug-in hybrid-electric vehicle (PHEV). A typical plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 stores energy that can be used by the electric machines 114. A vehicle battery pack 124 typically provides a high voltage direct current (DC) output. The traction battery 124 may be electrically coupled to one or more power electronics modules. One or more contactors 142 may isolate the traction battery 124 from other components when opened and connect the traction battery 124 to other components when closed. The power electronics module 126 may also be electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to the DC voltage compatible with the traction battery 124. The description herein is equally applicable to a pure electric vehicle. For a pure electric vehicle, the hybrid transmission 116 may be a gear box connected to an electric machine 114 and the engine 118 may not be present.

In addition to providing energy for propulsion, the traction battery 124 may provide energy for other vehicle electrical systems. A vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery). The low-voltage systems may be electrically coupled to the auxiliary battery. Other high-voltage loads 146, such as compressors and electric heaters, may be coupled to the high-voltage output of the traction battery 124. The electrical loads 146 may have an associated controller that operates and controls the electrical loads 146 when appropriate.

The vehicle 112 may be an electric vehicle or a plug-in hybrid vehicle in which the traction battery 124 may be recharged by an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled or connected may transfer power using a wireless inductive coupling.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system connections may be hydraulic and/or electrical. The brake system 150 may include a controller to monitor and coordinate operation of the wheel brakes 144. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
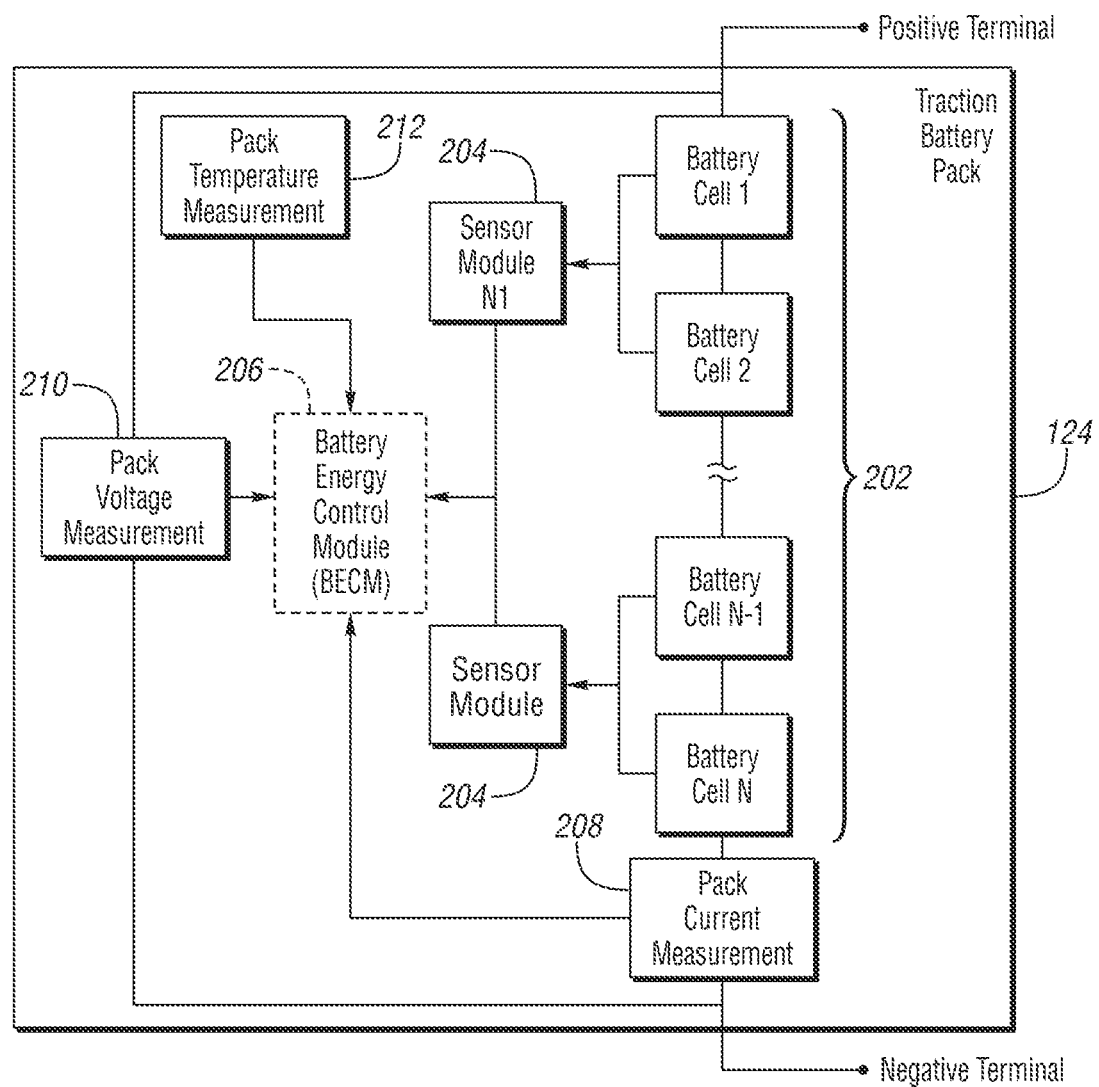
FIG. 2 is a diagram of a possible battery pack arrangement comprised of multiple cells, and monitored and controlled by a Battery Energy Control Module.

The traction battery 124 may be constructed from a variety of chemical formulations. Typical battery pack chemistries may be lead acid, nickel-metal hydride (NIMH) or Lithium-Ion. FIG. 2 shows a typical traction battery pack 124 in a simple series configuration of N battery cells 202. Other battery packs 124, however, may be composed of any number of individual battery cells connected in series or parallel or some combination thereof. A battery management system may have one or more controllers, such as a Battery Energy Control Module (BECM) 206, that monitor and control the performance of the traction battery 124. The battery pack 124 may include sensors to measure various pack level characteristics. The battery pack 124 may include one or more pack current measurement sensors 208, pack voltage measurement sensors 210, and pack temperature measurement sensors 212. The BECM 206 may include circuitry to interface with the pack current sensors 208, the pack voltage sensors 210 and the pack temperature sensors 212. The BECM 206 may have non-volatile memory such that data may be retained when the BECM 206 is in an off condition. Retained data may be available upon the next key cycle.

In addition to the pack level characteristics, there may be battery cell 202 level characteristics that are measured and monitored. For example, the terminal voltage, current, and temperature of each cell 202 may be measured. A system may use one or more sensor modules 204 to measure the battery cell 202 characteristics. Depending on the capabilities, the sensor modules 204 may measure the characteristics of one or multiple of the battery cells 202. The battery pack 124 may utilize up to $N_c$ sensor modules 204 to measure the characteristics of all the battery cells 202. Each of the sensor modules 204 may transfer the measurements to the BECM 206 for further processing and coordination. The sensor modules 204 may transfer signals in analog or digital form to the BECM 206. In some configurations, the functionality of the sensor modules 204 may be incorporated internally to the BECM 206. That is, the hardware of the sensor modules 204 may be integrated as part of the circuitry in the BECM 206 and the BECM 206 may handle the processing of raw signals. The BECM 206 may also include circuitry to interface with the one or more contactors 142 to open and close the contactors 142.

The traction battery 124 may operate more effectively in a particular temperature range. The traction battery 124 may include components for heating and cooling the traction battery 124 to maintain the battery temperature within an acceptable operating range. The thermal system may be an air-cooling system and/or a fluid cooling system. The additional thermal system adds components and cost to the battery pack. In addition, the potential for leaking fluid is undesirable in the battery pack environment. Further, operation of fans and pumps may increase audible noise in the vehicle. Other means of cooling the traction battery 124 are desirable.

It is possible to take advantage of a change in entropy inherent in the charge/discharge of electrochemical devices—such as capacitors. A capacitor may function by arranging electrically charged ions on opposite sides of electrode plates that are separated by a dielectric material. During charging, the ions are arranged near the electrode plates. Upon discharge, the charge separation is removed when a circuit is closed coupling the two opposing electrode plates. During discharge, the ions move between the electrode plates. The resulting behavior links the charge/discharge behavior with a change in entropy or the state of disorder of the system. With respect to the ions, entropy or disorder is decreased during charging and increased during discharging. Any change in entropy of the ions is offset by an opposite change in entropy of the capacitor.

It is observed that a temperature of a capacitor decreases as the capacitor is discharged. As the entropy of the ions increases during discharging, the entropy of the capacitor is decreasing. The amount of temperature decrease may depend on the discharge rate of the capacitor. Conversely, as the capacitor is charged, the temperature of the capacitor increases. The amount of temperature increase may depend on the charge rate of the capacitor. A net temperature decrease may be achieved by discharging the capacitor at a discharge rate that is greater than the charge rate of the capacitor.

The temperature change of the capacitor is a result of a change in entropy of the capacitor. As the capacitor is charged and discharged, charge on the capacitor changes order to a more ordered state or more disordered state. The change in entropy of the capacitor may be governed by:

$$\Delta S = -2NK_b \ln\left(\frac{V_f}{V_i}\right)$$

where N is the number of ions, $K_b$ is Boltzmann's constant, and V is the volume occupied by the ions at a final (subscript f) and an initial (subscript i) time.

Another component of the temperature change of the capacitor is Joule heating due to the resistance of the capacitor. The Joule heating component is present during charging and discharging and is not reversible. Current flowing into and out of the capacitor creates heat due to the resistance of the capacitor.

Figure 3:
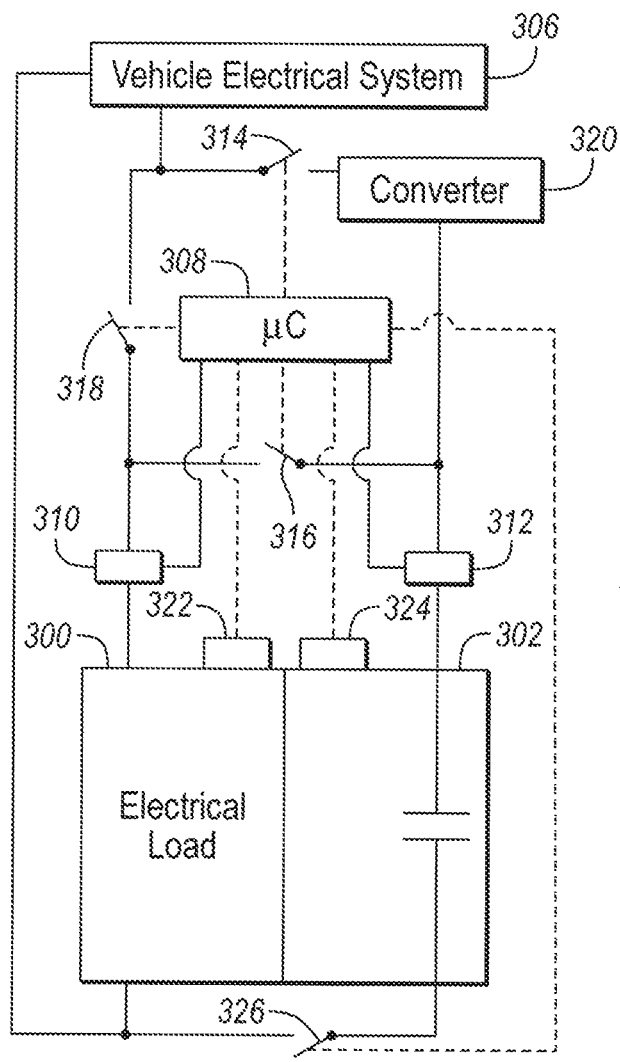
FIG. 3 is a diagram of a capacitor thermally coupled to an electrical load.

FIG. 3 depicts a configuration of a capacitor 302 in thermal contact with an electrical load 300. The electrical load 300 may be any electrical element or device. The electrical load 300 may be capable of sourcing and/or consuming electrical energy. The capacitor 302 may be a double-layer capacitor often referred to as a supercapacitor. The capacitor 302 may be arranged to be in thermal contact with the electrical load 300. For example, the capacitor 302 may be formed around a boundary of the electrical load 300 such that the capacitor 302 contacts an outer surface or sides of the electrical load 300. The capacitor 302 may be configured to maximize an amount of surface area that is in thermal contact with the electrical load 300. In some configurations, the capacitor 302 may be arranged to be in thermal contact with a base of the electrical load 300. Terminals of the capacitor 302 may be electrically coupled to terminals of the electrical load 300 such that the electrical load 300 and the capacitor 302 are electrically connected in parallel.

A controller 308 may be electrically coupled to the capacitor 302 and the electrical load 300. The controller 308 may include a processor or microcontroller that includes a processor along with volatile and non-volatile memory. The controller 308 may include additional circuitry for interfacing to the various components. The additional circuitry may provide isolation and scaling of signals for inputs and outputs of the controller 308. The capacitor 302 may be selectively electrically coupled to the terminals of the electrical load 300 via a first switching element 316. The switching elements referenced herein may be solid-state switching devices such as a transistor. In some configurations, the switching elements may be relays. The particular choice of the switching elements will depend on the voltage and current levels specified for the application. Control signals for the switching elements may be electrically coupled to the controller 308. The controller 308 may selectively couple the capacitor 302 to the electrical load 300 by controlling the first switching element 316.

The electrical load 300 may experience temperature changes as current passes through the device. The electrical load 300 may be a battery cell or a battery pack. The battery cell may experience temperature changes due to Joule heating and chemical reactions within the battery cell. Generally, additional means of cooling the battery are present. Some configurations may include air-cooling or liquid-cooling. The capacitor 302 may be controlled to provide some cooling of the battery cell. The charge and discharge rates of the capacitor 302 may be controlled such that the capacitor entropy is decreased (e.g., temperature decreases). As the capacitor 302 is in thermal contact with the electrical load 300, some cooling of the electrical load 300 will take place.

The electrical load 300 and the capacitor 302 may be electrically coupled to a vehicle electrical system 306. The vehicle electrical system 306 may include a power source or an on-board generator. The vehicle electrical system 306 may include additional electrical loads. The vehicle electrical system 306 may be electrically coupled to the terminals of the electrical load 300. The vehicle electrical system 306 may be selectively electrically coupled to the capacitor 302 via a second switching element 314. This allows the capacitor 306 to be charge and discharge via the vehicle electrical system 306. In some configurations, the vehicle electrical system 306 may be electrically coupled to the capacitor 302 via a voltage converter 320. The voltage converter 320 may be a DC/DC converter configured as a boost, buck, or boost/buck converter. The voltage converter 320 may be configured to provide a predetermined voltage to the capacitor 302. In configurations in which the electrical load 300 is a battery cell, the predetermined voltage may be a voltage level that is greater than a nominal voltage level of the battery cell. Note that the voltage converter 320 is not necessarily present in all applications.

A third switching element 318 may be present to selectively couple the vehicle electrical system 306 to the electrical load 300. The third switching element 318 permits the electrical load 300 to be isolated from the vehicle electrical system 306. The electrical load 300 may be electrically coupled to one or both of the vehicle electrical system 306 and the capacitor 302. FIG. 3 depicts switching devices for only one terminal of the electrical load 300 and the capacitor 302. However, additional switching devices may be present on return terminals of the electrical load 300 and the capacitor 302. For example, a fourth switching element 326 may be coupled between a return terminal of the capacitor 302 and a return terminal of the electrical load 300.

The controller 308 may be programmed to control the switching devices. A first measurement device 310 may be configured to provide voltage and/or current measurements associated with the electrical load 300. A second measurement device 312 may be configured to provide voltage and/or current measurements associated with the capacitor 302. Voltage measurement may be accomplished using a voltage divider network coupled to an analog-to-digital (A/D) input of the controller 308. Current measurement may be accomplished using a coil or Hall effect device coupled to another A/D input of the controller 308. The first measurement device 310 may be coupled to terminals of the electrical load 300. The second measurement device 312 may be coupled to terminals of the capacitor 302.

The switching devices 314, 316, 318, 326 may be controlled such that the capacitor 302 is charged to a predetermined voltage at a charging rate. During capacitor charging the capacitor 302 may be isolated from the electrical load 300 (e.g., switching element 316 open and 314 closed). When conditions are appropriate, the capacitor 302 may be coupled to the electrical load 300 (e.g., switching element 316 closed). The vehicle electrical system 306 may be isolated from the electrical load 300 and the capacitor 302 (e.g., switching element 314 and 318 open). At this time, the capacitor 302 may be discharged into the electrical load 300 at a discharging rate. The conditions for performing the discharge may include the capacitor voltage being a predetermined voltage above the electrical load voltage. Conditions for performing the discharge may include a demand for cooling of the electrical load 300. The discharging rate may be selected to be greater than the charging rate so that the capacitor temperature decreases. The discharging rate may be selected as a discharge current at which entropic cooling of the capacitor is greater than Joule heating of the capacitor. The discharge of the capacitor 302 causes the temperature of the capacitor 302 to decrease. As the capacitor 302 is in thermal contact with the electrical load 300, the electrical load temperature may decrease as well. The charge rate of the capacitor 302 may be selected as a charge current at which the total heating of the capacitor is less than the entropic cooling of the capacitor caused by the discharge current.

An electrical load temperature sensor 322 may be in thermal contact with the electrical load 300 and electrically coupled to the controller 308. A capacitor temperature sensor 324 may be in thermal contact with the capacitor 302 and electrically coupled to the controller 308. The controller 308 may process temperature readings such that an electrical load temperature and a capacitor temperature are available for control logic. The demand for cooling of the electrical load 300 may be derived from the temperature readings. For example, when the temperature associated with the electrical load 300 exceeds a predetermined threshold, cooling may be requested.

The components may be part of a thermal management system for the electrical load 300. The electrical load may include various electrical devices such as coils and power semiconductors (e.g., IGBT). During operation these electrical devices may generate heat and benefit from thermal management to maintain the temperature within a predetermined range. In applications in which the electrical load 300 is a battery, the components may be part of the battery management system. For example, the components may be incorporated into the BECM 206.

Figure 4:
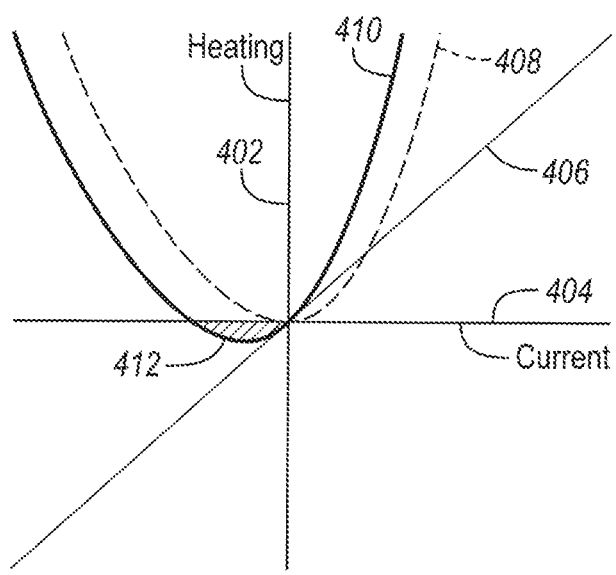
FIG. 4 is a plot of entropic and Joule heating versus current for a capacitor.

The discharge current may be selected to provide a net cooling effect. When the discharge current exceeds a predetermined level, Joule heating of the capacitor 302 may begin negating the cooling effect. If the discharge current is selected as too large, the Joule heating effects may dominate and actually cause a temperature increase of the capacitor 302. The discharge current may be selected to optimize the cooling effect and minimize the impact of the associated Joule heating of the capacitor 302. FIG. 4 shows a plot 400 describing the behavior of the heating/cooling effect for a capacitor. The plot depicts curves representing the heating/cooling 402 of the capacitor as a function of current 404. A first curve 406 represents the entropic heating described herein. Note that during charging (e.g., current greater than zero) the capacitor is heated and during discharging (e.g., current less than zero) the capacitor is cooled. A second curve 408 represents the Joule heating of the capacitor. Joule heating of the capacitor leads to heating during charging and discharging of the capacitor. A third curve 410 represents the total heating due to entropic and Joule heating processes within the capacitor. A region 412 exists where there is a net cooling effect of the capacitor. Operation of the capacitor in this region may lead to a net cooling of the capacitor. There may be an optimal discharge current at which a maximum amount of cooling occurs. Further, it is also observed that the current levels for charging and discharging should not be the same since the heating increases rapidly as charge current is increased.

In an example configuration, the electrical load 300 may be a battery cell. When the electrical load 300 is configured to supply energy, the third switching element 318 may not be present. The addition of the capacitor 302 in this configuration may also aid in performing battery cell balancing. Battery cell balancing is the process of equalizing voltage and state of charges across all of the battery cells that comprising a battery pack. Further, the capacitor 306 permits additional energy storage capability for the battery pack. In response to a demand for energy storage, the controller 308 may electrically couple the capacitor to the battery to charge the capacitor. Storage of electrical energy in the capacitor 302 may reduce usage of the battery under some conditions leading to reduced heating of the battery itself. In some configurations, a demand for energy storage in the capacitor may be initiated to reduce heating in the battery. In some configurations, a demand for energy storage may be initiated when the battery is at a high state of charge during a regenerative braking event. The controller 308 may operate the switching devices to alternately charge and discharge the capacitor to change the voltage of the battery cell. The process additionally provides some cooling to the battery cell.

In some configurations, the capacitor 302 may be in thermal contact with a plurality of battery cells. For example, the capacitor 302 may be configured as a floor of the battery pack 124. As such, the capacitor 302 may be in thermal contact with the plurality of battery cells 202. The capacitor 302 may be electrically coupled to terminals of the traction battery 124 instead of terminals of each of the battery cells 202.

The switching elements 314, 316, 318, 326 and voltage converter 320 may be operated by the controller 308. During some time periods, the capacitor 302 may be charged to a predetermined voltage. During some other time periods, the capacitor 302 may be coupled to the traction battery 124 to be discharged. The discharge rate may be selected to be greater than the charge rate. During the discharge, the voltage across the capacitor decreases. The energy stored in the capacitor 302 is transferred to the traction battery 124 or other loads that draw current from the power system. In some configurations, the capacitor 302 may discharge to provide power to loads 146 connected to terminals of the traction battery 124 (e.g., the vehicle electrical system 306). If the traction battery 124 remains in a neutral condition, that is, a zero-current state, heating of the traction battery 124 may be avoided. There may be a net cooling caused by the discharging of the capacitor 302 to supply the connected loads.

Figure 5:
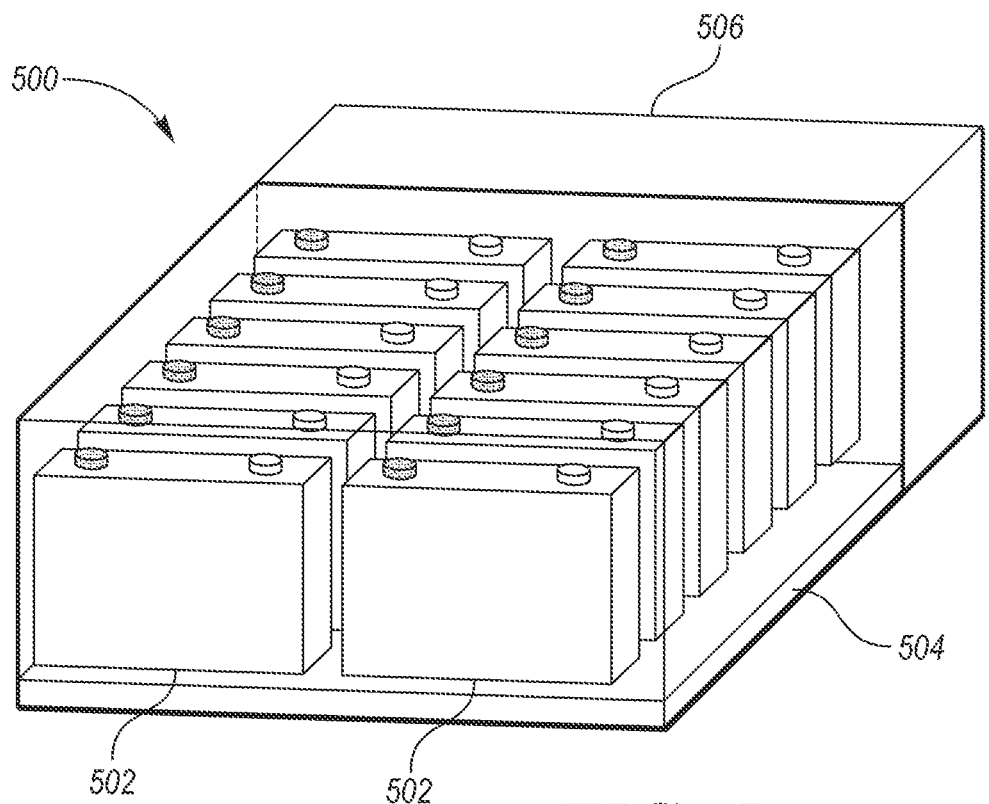
FIG. 5 is a diagram of a capacitor thermally coupled to a battery pack for cooling the battery pack.

FIG. 5 depicts a possible configuration for battery pack cooling. A battery pack 500 may include a plurality of battery cells 502. A battery pack capacitor 504 may be thermally coupled to the battery cells 502. The battery pack capacitor 504 may be electrically coupled to terminals of the battery pack 500. For example, the battery pack capacitor 504 may be arranged on a floor of a housing to support the battery cells 502. In other configurations, the battery pack capacitor 504 may wrap around the battery cells 502 and thermally contact sides of the battery cells 502. A battery management system 506 may be included in the battery pack 500 and include the circuitry and controller for managing the battery pack capacitor 502 in the manner described.

Figure 6:
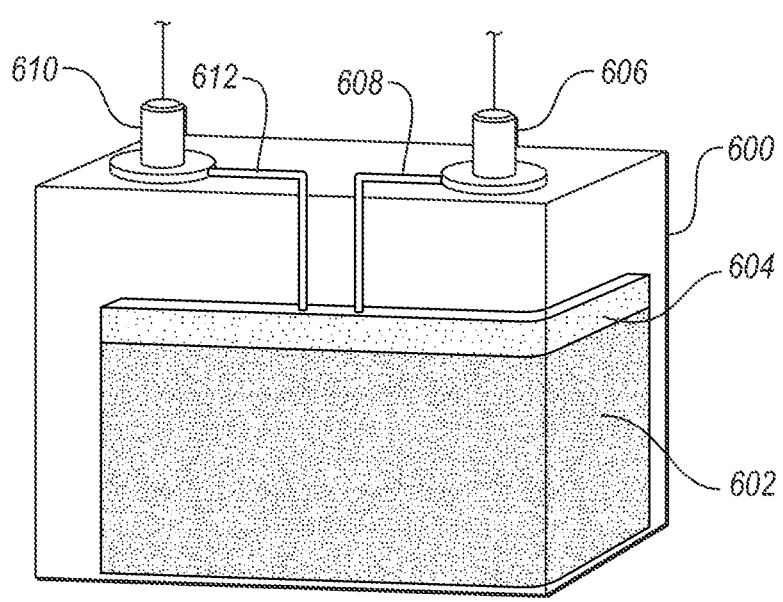
FIG. 6 is a diagram of a capacitor thermally and electrically coupled to a battery cell to provide cooling for the battery cell.

FIG. 6 depicts a possible configuration for battery cell cooling. A battery cell capacitor 602 may be thermally coupled to a battery cell 600. A balancing controller 604 may be coupled between the battery cell capacitor 602 and battery cell terminals 606 and 610. Circuits 608 and 612 may couple the balancing controller 604 to the battery cell terminals 606 and 610 respectively. The circuits 608 and 612 may include additional sensing or control circuitry. Other methods and configurations are possible for integrating the battery cell capacitor 602 and balancing controller 604 to the battery cell 600. In some configurations, the battery cell capacitor 602 may be configured to wrap around a surface of the battery cell 600 to maximize thermal contact with the battery cell 602.

The added benefit of utilizing the capacitor 302 in thermal contact with the traction battery 124 or battery cells 202 is that battery cell balancing may be achieved. The additional hardware may aid in cooling of the traction battery 124 and balancing the battery cells 202. The effect on cooling may permit resizing of other thermal management devices and improve noise characteristics of the thermal management system.

Figure 7:
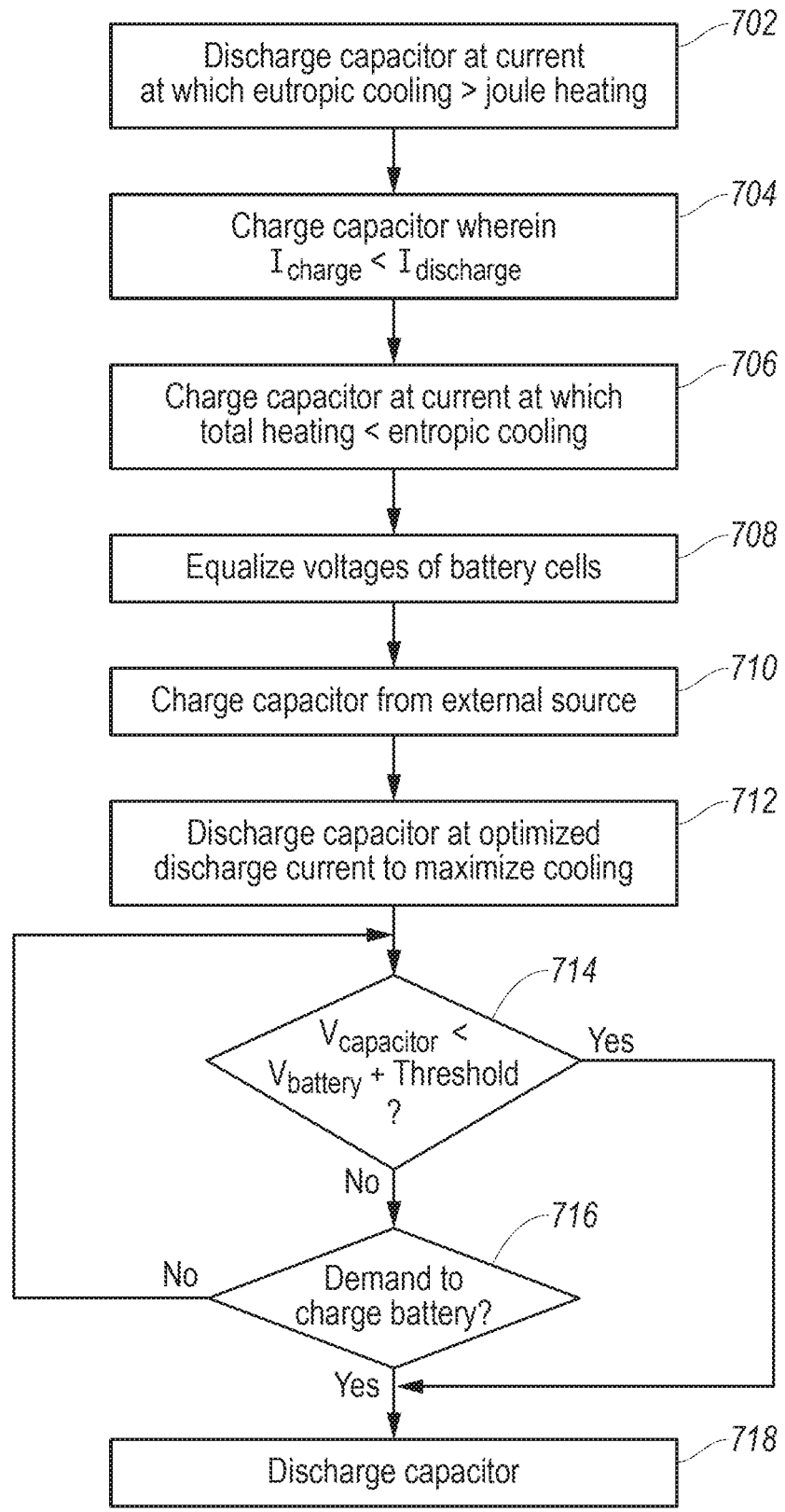
FIG. 7 is a flow diagram of a battery cooling process using the capacitor.

FIG. 7 is a flow diagram of a battery cooling process 700 using the capacitor. At operation 702, the process discharges a capacitor 302 that is thermally and electrically coupled to a battery 300 at a discharge current at which entropic cooling of the capacitor is greater than Joule heating of the capacitor in response to a demand for battery cooling. At operation 704, the process charges the capacitor 302 at a charge current $I_{charge}$ that is less than the discharge current $I_{discharge}$. At operation 706, the process charges the capacitor 302 at the charge current at which total heating of the capacitor 302 is less than the entropic cooling of the capacitor caused by the discharge current. At operation 708, the process equalizes voltages of cells of the battery 300 by charging the capacitor 302 from the battery 300 and discharging the capacitor 302 into the battery 300 in response to a demand for battery balancing. At operation 710, the process charges the capacitor 302 from a power source external to the battery 300. At operation 712, the process discharges the capacitor 302 at an optimized discharge current that maximizes net cooling of the capacitor 302. Responsive to detecting the capacitor voltage $V_{capacitor}$ is greater than the battery voltage $V_{Battery}$ by a predetermined threshold at operation 714, the process proceeds to operation 718 and the process selectively discharge the capacitor 302. Otherwise, the process proceeds to operation 716 and the process further determines if a demand for charge current to the battery 302 is received by the controller 308. If the answer is a yes, the process proceeds to operation 718. Otherwise, the process returns to operation 714.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A thermal management system comprising:
    a capacitor in thermal contact with an electrical load; and
    a controller configured to selectively electrically couple the capacitor to a vehicle electrical system and the electrical load and programmed to, in response to a demand for cooling of the electrical load, selectively discharge the capacitor at a discharge current at which entropic cooling of the capacitor is greater than Joule heating of the capacitor, wherein the electrical load is a battery.

2. The thermal management system of claim 1 wherein the controller is further programmed to selectively charge the capacitor at a charge current that is less than the discharge current.

3. The thermal management system of claim 1 wherein the controller is further programmed to selectively charge the capacitor at a charge current at which total heating of the capacitor is less than the entropic cooling of the capacitor caused by the discharge current.

4. The thermal management system of claim 1 further comprising a voltage converter configured to selectively electrically couple the capacitor to the vehicle electrical system and wherein the controller is further programmed to command the voltage converter to output a predetermined voltage level for charging the capacitor.

5. The thermal management system of claim 1 wherein the controller is further programmed to selectively discharge the capacitor further in response to a capacitor voltage being greater than a voltage of the electrical load by a predetermined amount.

6. The thermal management system of claim 1 wherein the controller is further programmed to selectively discharge the capacitor further in response to a demand for charge current to the electrical load.

7. A battery management system comprising:
    a capacitor in thermal contact with a battery; and
    a controller configured to selectively electrically couple the capacitor to the battery to charge and discharge the capacitor and programmed to, in response to a demand for cooling of the battery, selectively discharge the capacitor at a discharge current at which entropic cooling of the capacitor is greater than Joule heating of the capacitor.

8. The battery management system of claim 7 wherein the controller is further programmed to, in response to a demand for battery cell balancing, electrically couple the capacitor to the battery to charge and discharge the capacitor to achieve a target voltage for the battery.

9. The battery management system of claim 7 wherein the controller is further programmed to, in response to a demand for energy storage, electrically couple the capacitor to the battery to charge the capacitor.

10. The battery management system of claim 7 wherein the capacitor is configured to wrap around a surface of the battery to maximize thermal contact.

11. The battery management system of claim 7 wherein the controller is further programmed to selectively electrically couple to capacitor to the battery to charge the capacitor at a charge current that is less than the discharge current.

12. The battery management system of claim 7 wherein the controller is further programmed to selectively charge the capacitor at a charge current at which total heating of the capacitor is less than the entropic cooling of the capacitor caused by the discharge current.

13. The battery management system of claim 7 further comprising a voltage converter configured to selectively electrically couple the capacitor to the battery and wherein the controller is further programmed to command the voltage converter to output a voltage level to cause the capacitor to charge at a charge current that is less than the discharge current.

14. A method comprising:
    discharging a capacitor that is thermally and electrically coupled to a battery at a discharge current at which entropic cooling of the capacitor is greater than Joule heating of the capacitor in response to a demand for battery cooling; and
    charging the capacitor at a charge current that is less than the discharge current.

15. The method of claim 14 further comprising charging the capacitor at the charge current at which total heating of the capacitor is less than the entropic cooling of the capacitor caused by the discharge current.

16. The method of claim 14 further comprising equalizing voltages of cells of the battery by charging the capacitor from the battery and discharging the capacitor into the battery in response to a demand for battery balancing.

17. The method of claim 14 further comprising charging the capacitor from a power source external to the battery.

18. The method of claim 14 further comprising discharging the capacitor at an optimized discharge current that maximizes net cooling of the capacitor.

* * * * *